United States Patent
Recio et al.

(10) Patent No.: US 11,916,890 B1
(45) Date of Patent: *Feb. 27, 2024

(54) DISTRIBUTION OF A CRYPTOGRAPHIC SERVICE PROVIDED PRIVATE SESSION KEY TO NETWORK COMMUNICATION DEVICE FOR SECURED COMMUNICATIONS

(71) Applicant: INTERNATIONAL BUSINESS MACHINES CORPORATION, Armonk, NY (US)

(72) Inventors: Renato J. Recio, Austin, TX (US); Ryan Moats, Omaha, NE (US); Eran Gampel, Tel Aviv (IL); Gal Sagi, Hod Hasharon (IL); Ravinder Reddy Amanaganti, San Ramon, CA (US); Etai Lev Ran, Nofit (IL); Dean Har'el Lorenz, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,425

(22) Filed: Aug. 8, 2022

(51) Int. Cl.
*H04L 9/40* (2022.01)
*H04L 67/146* (2022.01)

(52) U.S. Cl.
CPC ........ *H04L 63/0435* (2013.01); *H04L 63/029* (2013.01); *H04L 67/146* (2013.01)

(58) Field of Classification Search
CPC .. H04L 63/0435; H04L 63/029; H04L 67/146
See application file for complete search history.

(56) References Cited

U.S. PATENT DOCUMENTS 8,019,868 B2 * 9/2011 Rao ............... H04L 61/2557
709/224
9,231,923 B1 * 1/2016 Cignetti ............. H04L 63/061
(Continued)

FOREIGN PATENT DOCUMENTS

| CN | 103227742 A | 7/2013 |
| CN | 108293058 A | 7/2018 |

(Continued)

OTHER PUBLICATIONS

Cui, T.et al., "Offloading Load Balancers onto SmartNICs," In Proceedings of the 12th ACM SIGOPS Asia-Pacific Workshop on Systems, Aug. 24, 2021, pp. 56-62.

(Continued)

*Primary Examiner* — Darren B Schwartz
(74) *Attorney, Agent, or Firm* — CUENOT, FORSYTHE & KIM, LLC

(57) ABSTRACT

A secure communication tunnel between user space software and a client device can be established. A private session key can be accessed from a cryptographic service. The private session key can be communicated from the user space software to a network communication device. Outbound session packets can be communicated from the user space software to the network communication device. The network communication device can be configured to generate encrypted outbound session packets by encrypting the outbound session packets using the private session key; communicate to the client device, via the secured communication tunnel, the encrypted outbound session packets; receive from the client device, via the secured communication tunnel, inbound session packets; generate decrypted inbound session packets by decrypting the inbound session packets using the private session key; and communicate the decrypted inbound session packets.

18 Claims, 7 Drawing Sheets

(56) References Cited

U.S. PATENT DOCUMENTS

| | | | |
|---|---|---|---|
| 9,608,962 B1* | 3/2017 | Chang | H04L 63/0428 |
| 10,177,909 B1 | 1/2019 | Sullivan et al. | |
| 10,432,590 B2 | 10/2019 | Skuratovich et al. | |
| 10,432,591 B2 | 10/2019 | Skuratovich et al. | |
| 10,469,461 B1* | 11/2019 | Singh | H04L 63/029 |
| 10,581,819 B1* | 3/2020 | Lototskiy | H04L 63/168 |
| 10,785,198 B2 | 9/2020 | Pahl et al. | |
| 10,909,250 B2* | 2/2021 | Rudzitis | H04L 9/083 |
| 11,240,007 B1 | 2/2022 | Higgins | H04L 9/3268 |
| 11,343,247 B1* | 5/2022 | Ozarkar | H04L 67/56 |
| 11,368,298 B2 | 6/2022 | Mestery et al. | |
| 11,765,142 B1 | 9/2023 | Recio et al. | |
| 2007/0110054 A1* | 5/2007 | Kozakai | H04L 61/2517 370/466 |
| 2008/0040775 A1* | 2/2008 | Hoff | H04L 63/062 726/1 |
| 2008/0147555 A1* | 6/2008 | Cromer | G06Q 30/06 705/52 |
| 2010/0146582 A1* | 6/2010 | Jaber | G06F 21/6218 726/1 |
| 2010/0325418 A1* | 12/2010 | Kanekar | H04L 63/0823 713/151 |
| 2011/0153985 A1* | 6/2011 | Saha | H04L 63/166 712/42 |
| 2011/0314284 A1* | 12/2011 | Chou | H04L 9/3273 713/169 |
| 2012/0078994 A1* | 3/2012 | Jackowski | H04L 47/24 709/202 |
| 2012/0177202 A1* | 7/2012 | Dayka | H04L 9/0822 380/281 |
| 2012/0278878 A1* | 11/2012 | Barkie | H04L 63/0485 726/15 |
| 2013/0179685 A1* | 7/2013 | Weinstein | H04L 63/0428 713/168 |
| 2013/0268643 A1* | 10/2013 | Chang | G06F 9/5077 709/223 |
| 2014/0208123 A1* | 7/2014 | Roth | G06F 21/575 713/189 |
| 2014/0226661 A1* | 8/2014 | Mekkattuparamban | H04L 49/70 370/392 |
| 2014/0280948 A1* | 9/2014 | Schmidt | H04L 63/0272 709/226 |
| 2015/0121076 A1* | 4/2015 | Wante | H04L 9/14 713/171 |
| 2016/0099917 A1* | 4/2016 | Glazemakers | H04L 63/0272 726/12 |
| 2016/0173488 A1* | 6/2016 | Xie | H04L 9/3263 713/156 |
| 2017/0006034 A1 | 1/2017 | Link, II | |
| 2017/0013015 A1* | 1/2017 | Dinha | H04L 63/0272 |
| 2017/0033930 A1* | 2/2017 | Costa | G06F 21/606 |
| 2017/0034129 A1* | 2/2017 | Sawant | H04L 12/4633 |
| 2017/0063808 A1* | 3/2017 | Manapragada | H04L 63/0272 |
| 2017/0085372 A1* | 3/2017 | Anderson | H04L 63/0471 |
| 2017/0093820 A1* | 3/2017 | Forguson | H04L 9/0891 |
| 2017/0118180 A1* | 4/2017 | Takahashi | H04L 69/22 |
| 2017/0373828 A1* | 12/2017 | Michiels | G06F 21/75 |
| 2018/0034791 A1* | 2/2018 | Erez | G06F 21/53 |
| 2018/0041613 A1* | 2/2018 | Lapidous | H04L 67/564 |
| 2018/0062835 A1* | 3/2018 | Hamel | H04L 9/0894 |
| 2018/0165224 A1* | 6/2018 | Brown | G06F 21/57 |
| 2018/0234401 A1* | 8/2018 | Cates | H04W 12/0433 |
| 2018/0367525 A1 | 12/2018 | Kassimis et al. | |
| 2019/0014145 A1* | 1/2019 | Levine | H04L 63/0869 |
| 2019/0190887 A1* | 6/2019 | Yan | H04L 61/5007 |
| 2019/0199835 A1* | 6/2019 | Deval | H04L 69/162 |
| 2019/0372936 A1* | 12/2019 | Sullenberger | H04L 63/164 |
| 2020/0099671 A1* | 3/2020 | Shaw | H04L 63/061 |
| 2020/0127981 A1* | 4/2020 | Yang | H04L 63/068 |
| 2020/0220713 A1* | 7/2020 | Li | H04L 9/14 |
| 2020/0236140 A1* | 7/2020 | Srinivasan | H04L 5/0055 |
| 2020/0403919 A1* | 12/2020 | Cui | H04L 63/0428 |
| 2021/0099286 A1* | 4/2021 | Xiao | H04L 63/061 |
| 2021/0127269 A1* | 4/2021 | Gupta | H04L 63/061 |
| 2021/0176217 A1 | 6/2021 | Liu et al. | |
| 2021/0185025 A1* | 6/2021 | Wang | G06F 9/5077 |
| 2021/0226935 A1* | 7/2021 | Mundt | H04L 63/0464 |
| 2021/0250174 A1 | 8/2021 | Cheng et al. | |
| 2021/0392080 A1* | 12/2021 | Shen | H04L 47/22 |
| 2022/0173886 A1* | 6/2022 | Sardesai | H04L 63/0428 |
| 2022/0263811 A1 | 8/2022 | Kampati et al. | |
| 2022/0394014 A1* | 12/2022 | Wang | H04L 63/04 |
| 2023/0007709 A1 | 1/2023 | Paladugu et al. | |
| 2023/0058273 A1* | 2/2023 | Sundar | H04L 9/14 |

FOREIGN PATENT DOCUMENTS

| | | |
|---|---|---|
| CN | 113826353 A | 12/2021 |
| CN | 114788225 A | 7/2022 |
| WO | 2021138511 A1 | 7/2021 |

OTHER PUBLICATIONS

Kim, D. et al., "A Case for SmartNIC-accelerated Private Communication," 4th Asia-Pacific Workshop on Networking, Aug. 3, 2020, pp. 30-35.

Kumari, A.K. et al., "A Symmetric Two-Server Password based Authentication and Key Exchange Protocol Deployed in PaaS," International Journal of Computer Applications, International Conference on Innovations in Computing Techniques, ICICT 2015, vol. 975, p. 8887 (7 pg).

Tork, M. et al., "Lynx: A SmartNIC-driven Accelerator-centric Architecture for Network Servers," In Proceedings of the Twenty-Fifth International Conference on Architectural Support for Programming Languages and Operating Systems, Mar. 9, 2020, pp. 117-131.

Pfister, G.F., "An introduction to the infiniband architecture," High Performance Mass Storage and Parallel I/O, Chap. 42, Jun. 2001, pp. 617-632.

"Getting Started with IBM Cloud Hyper Protect Crypto Services," [online] IBM Cloud Docs, Hyper Protect Crypto Services, Last modified Jun. 28, 2022 [retrieved Aug. 8, 2022], retrieved from the Internet: <https://cloud.ibm.com/docs/hs-crypto?topic=hs-crypto-get-started>, 11 pg.

Taranov, K. et al., "sRDMA—Efficient {NIC-based} Authentication and Encryption for Remote Direct Memory Access," In 2020 USENIX Annual Technical Conference (USENIX ATC 20), Jul. 15-17, 2020, pp. 691-704.

Mell, P. et al., The NIST Definition of Cloud Computing, National Institute of Standards and Technology, U.S. Dept. of Commerce, Special Publication 800-145, Sep. 2011, 7 pg.

Recio, R.J. et al., "RFC 5040: A remote direct memory access protocol specification," [online] Standards Track, Tech-Invite, Oct. 2007, retrieved from the Internet: <https://www.rfc-editor.org/rfc/rfc5040>, 22 pg.

"TCP offload engine," [online] from Wikipedia, the free encyclopedia, Jun. 6, 2022, retrieved from the Internet: <https://en.wikipedia.org/wiki/TCP_offload_engine>, 7 pg.

IBM: List of IBM Patents or Patent Applications Treated as Related, Aug. 9, 2022, 2 pg.

Recio, R.J. et al., "API Based Distribution of Private Session Key to Network Communication Device for Secured Communications", U.S. Appl. No. 17/883,349, filed Aug. 8, 2022, 42 pages.

Recio, R.J. et al., "Distribution of Private Session Key to a Network Communication Device for Secured RDMA Communications", U.S. Appl. No. 17/883,378, filed Aug. 8, 2022, 46 pages.

Recio, R.J. et al., "Based Distribution of Private Session Key to Network Communication Device for Secured Communicationss", U.S. Appl. No. 17/883,328, filed Aug. 8, 2022, 42 pages.

Recio, R.J. et al., "Distribution of Private Session Key and Offloading a Protocol Stack to a Network Communication Device for Secured Communications", U.S. Appl. No. 17/883,449, filed Aug. 8, 2022, 42 pages.

WIPO Appln. No. PCTCN2023107105, International Search Report and Written Opinion, dated Sep. 21, 2023, 8 pg.

(56) References Cited

OTHER PUBLICATIONS

WIPO Appln. No. PCTCN2023107214, International Search Report and Written Opinion, dated Sep. 20, 2023, 7 pg.
Lescisin, M. et al., "SocialSDN: Design and Implementation of a Secure Internet Protocol Tunnel Between Social Connections," In 2021 IEEE Int'l. Systems Conf. (SysCon), Dec. 31, 2021, 8 PG.

* cited by examiner

700

```
┌─────────────────────────────────────────────────────────────┐
│ Establish a secure communication tunnel between user space  │
│ software and a client device                                │
│ 702                                                         │
└─────────────────────────────────────────────────────────────┘
                              ↓
┌─────────────────────────────────────────────────────────────┐
│ Access a private session key from a cryptographic service   │
│ 704                                                         │
└─────────────────────────────────────────────────────────────┘
                              ↓
┌─────────────────────────────────────────────────────────────┐
│ Communicate, from the user space software to a network      │
│ communication device, the private session key               │
│ 706                                                         │
└─────────────────────────────────────────────────────────────┘
                              ↓
┌─────────────────────────────────────────────────────────────┐
│ Communicate, from the user space software to the network    │
│ communication device, outbound session packets              │
│ 708                                                         │
└─────────────────────────────────────────────────────────────┘
                              ↓
┌─────────────────────────────────────────────────────────────┐
│ Generate encrypted outbound session packets by encrypting   │
│ the outbound session packets using the private session key  │
│ 710                                                         │
└─────────────────────────────────────────────────────────────┘
                              ↓
┌─────────────────────────────────────────────────────────────┐
│ Communicate, to the client device via the secured           │
│ communication tunnel, the encrypted outbound session packets│
│ 712                                                         │
└─────────────────────────────────────────────────────────────┘
                              ↓
┌─────────────────────────────────────────────────────────────┐
│ Receive from the client device, via the secured             │
│ communication tunnel, inbound session packets               │
│ 714                                                         │
└─────────────────────────────────────────────────────────────┘
                              ↓
┌─────────────────────────────────────────────────────────────┐
│ Generate decrypted inbound session packets by decrypting    │
│ the inbound session packets using the private session key   │
│ 716                                                         │
└─────────────────────────────────────────────────────────────┘
                              ↓
┌─────────────────────────────────────────────────────────────┐
│ Communicate, to the user space software, the decrypted      │
│ inbound session packets                                     │
│ 718                                                         │
└─────────────────────────────────────────────────────────────┘
```

FIG. 7

DISTRIBUTION OF A CRYPTOGRAPHIC SERVICE PROVIDED PRIVATE SESSION KEY TO NETWORK COMMUNICATION DEVICE FOR SECURED COMMUNICATIONS

BACKGROUND

The present invention relates to data encryption, and more specifically, to communication session data encryption.

Data encryption is used to secure data by encoding the data so that the data is incomprehensible until it the data decoded. Data encryption oftentimes is applied to data being communicated over the Internet. Internet Key Exchange (IKE) is a security protocol commonly implemented for secure Internet communications. IKE uses a session key to encrypt and decrypt data. A session key is a single-use symmetric cryptographic key used for encrypting/decrypting messages in a communication session. In this regard, a session key is a temporary key typically only used for a particular communication session. Other communication sessions will have their own session keys.

SUMMARY

A method includes establishing a secure communication tunnel between user space software and a client device. The method also can include accessing a private session key from a cryptographic service. The method also can include communicating, from the user space software to a network communication device, the private session key. The method also can include communicating, from the user space software to the network communication device, outbound session packets. The network communication device can be programmed to initiate operations including: generating, by the network communication device, encrypted outbound session packets by encrypting the outbound session packets using the private session key; communicating, by the network communication device to the client device via the secured communication tunnel, the encrypted outbound session packets; receiving, by the network communication device from the client device, via the secured communication tunnel, inbound session packets; generating, by the network communication device, decrypted inbound session packets by decrypting the inbound session packets using the private session key; and communicating, from the network communication device to the user space software, the decrypted inbound session packets.

A system includes a processor programmed to initiate executable operations. The executable operations include establishing a secure communication tunnel between user space software and a client device. The executable operations also can include accessing a private session key from a cryptographic service. The executable operations also can include communicating, from the user space software to a network communication device, the private session key. The executable operations also can include communicating, from the user space software to the network communication device, outbound session packets. The network communication device can be programmed to initiate executable operations including: generating, by the network communication device, encrypted outbound session packets by encrypting the outbound session packets using the private session key; communicating, by the network communication device to the client device via the secured communication tunnel, the encrypted outbound session packets; receiving, by the network communication device from the client device, via the secured communication tunnel, inbound session packets; generating, by the network communication device, decrypted inbound session packets by decrypting the inbound session packets using the private session key; and communicating, from the network communication device to the user space software, the decrypted inbound session packets.

A computer program product includes a computer readable storage medium having program code stored thereon. The program code is executable by a data processing system to initiate operations. The operations include establishing a secure communication tunnel between user space software and a client device. The operations also can include accessing a private session key from a cryptographic service. The operations also can include communicating, from the user space software to a network communication device, the private session key. The operations also can include communicating, from the user space software to the network communication device, outbound session packets. The network communication device can be programmed to initiate operations including: generating, by the network communication device, encrypted outbound session packets by encrypting the outbound session packets using the private session key; communicating, by the network communication device to the client device via the secured communication tunnel, the encrypted outbound session packets; receiving, by the network communication device from the client device, via the secured communication tunnel, inbound session packets; generating, by the network communication device, decrypted inbound session packets by decrypting the inbound session packets using the private session key; and communicating, from the network communication device to the user space software, the decrypted inbound session packets.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 7 depicts a flowchart illustrating a method of performing user space communication session encryption initialization.

DETAILED DESCRIPTION

Figure 1:
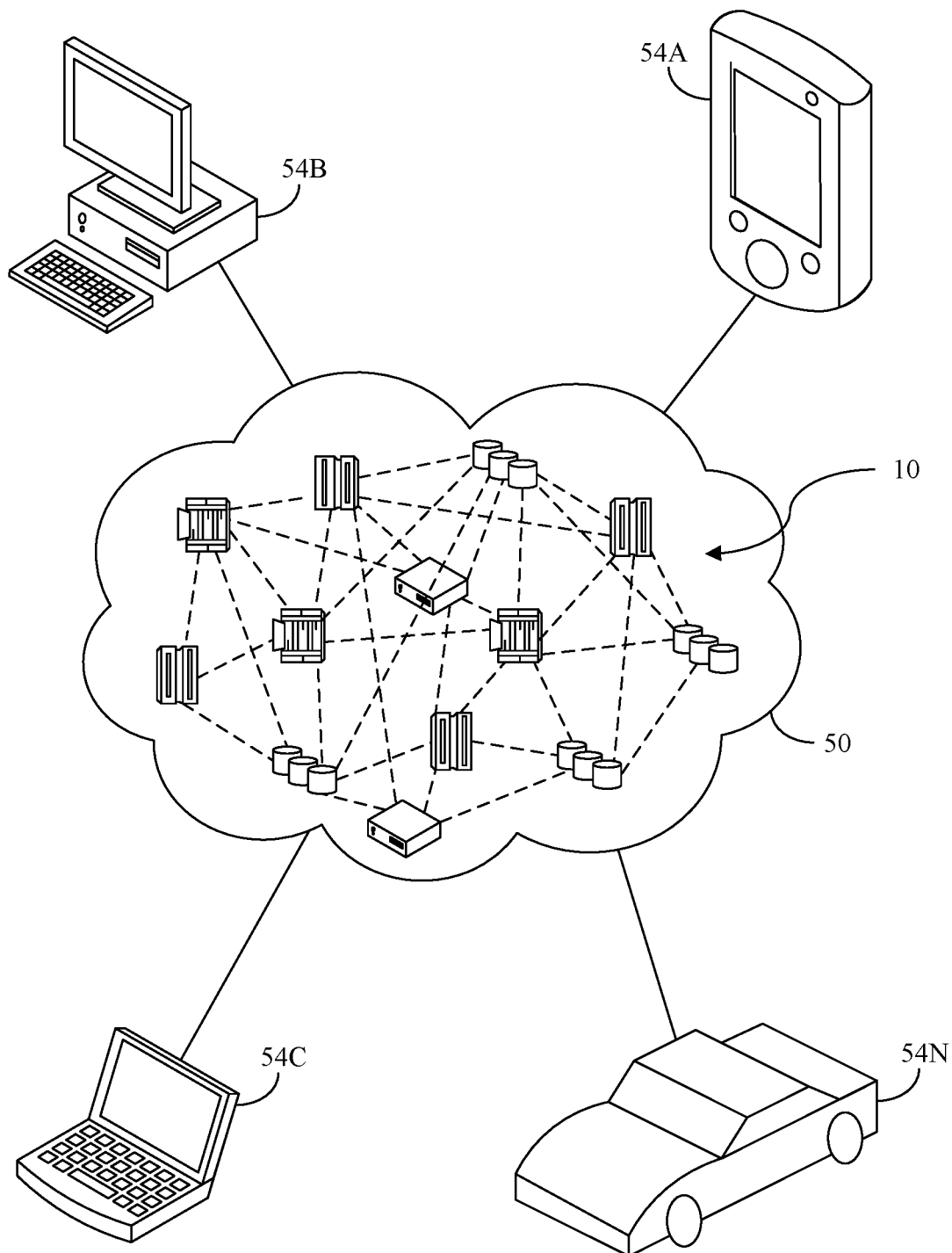
FIG. 1 depicts a cloud computing environment according to an embodiment of the present invention.

This disclosure relates to data encryption, and more specifically, to communication session data encryption.

The arrangements described herein are directed to computer technology, and provide an improvement to computer technology. Specifically, the present arrangements improve communication session data security, while reducing the use of resources to implement data security at the management and virtualization functional abstraction layers provided by cloud computing environments.

In accordance with the arrangements described herein, an application programming interface Private session key for a secure data communication session can be generated in user space of a host data processing system. The Private session key then can be stored on a network communication device, and the network communication device can implement data encryption and decryption for the communication session. Accordingly, the host hypervisor stack and virtual machine operating system space need not generate, nor store, the Private session key, and need not allocate valuable data processing resources to implement data encryption/decryption for the communication session. This serves to free up processor and memory resources on the host data processing system, which otherwise would be used for performing data encryption/decryption for the communication session, to be used for other tasks. Moreover, by virtue of the Private session key being stored on the network communication device rather than in the host hypervisor stack or in the virtual Machine operating system space, the risk of the Private session key being discovered by an unscrupulous party gaining unauthorized access to the host data processing system is mitigated.

Several definitions that apply throughout this document now will be presented.

As defined herein, the term "user space" means data processing system memory (e.g., local memory and/or cache memory) segregated from kernel space and allocated to running applications hosted for access by client devices. User space can be, for example, a portion of virtual memory segregated from virtual memory allocated as kernel space.

As defined herein, the term "kernel space" means data processing system memory (e.g., local memory and/or cache memory) allocated to running kernel applications, and also may include data processing system memory allocated to running hypervisor applications.

As defined herein, the term "public key" means a cryptographic key sent from a first system or device to a second system or device and used for secure data communications, wherein encrypted messages only can be deciphered by the second system or device by use of the public key, for example by using the public key to generate a private session key used to decrypt the encrypted messages.

As defined herein, the term "private session key" means a cryptographic key only known to a particular system or device and used by that system or device to decrypt encrypted messages communicated to that system or device.

As defined herein, the term "session packet" means is a unit of data made into a single package that travels along a network path.

As defined herein, the term "encrypted session packet" means a session packet that is encrypted using a cryptographic key, for example using a private session key.

As defined herein, the term "secure communication tunnel" means an encrypted communication link between a first system or device and a second system or device.

As defined herein, the term "n-tuple" means a finite ordered list of elements, where n is a non-negative integer.

As defined herein, the term "network communication device" means a network adapter or a switch.

As defined herein, the term "network adapter" means a hardware device that connects a data processing system to a data communications network. Although data processing systems and network infrastructure may include one or more network adapters, data processing systems (e.g., servers and client devices) are not network adapters as the term "network adapter" is defined herein, and network infrastructure (e.g., routers, firewalls, switches, access points and the like) are not network adapters as the term "network adapter" is defined herein.

As defined herein, the term "switch" means a hardware device in network infrastructure that connects devices on a data communications network, using packet switching to receive data and forward data to a destination device.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory. A network adapter, per se, is not a data processing system as the term "data processing system" is defined herein. Network infrastructure, such as routers, firewalls, switches, access points and the like, are not data processing systems as the term "data processing system" is defined herein.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. A network adapter, per se, is not a client device as the term "client device" is defined herein. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "automatically" means without user intervention.

As defined herein, the term "user" means a person (i.e., a human being).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
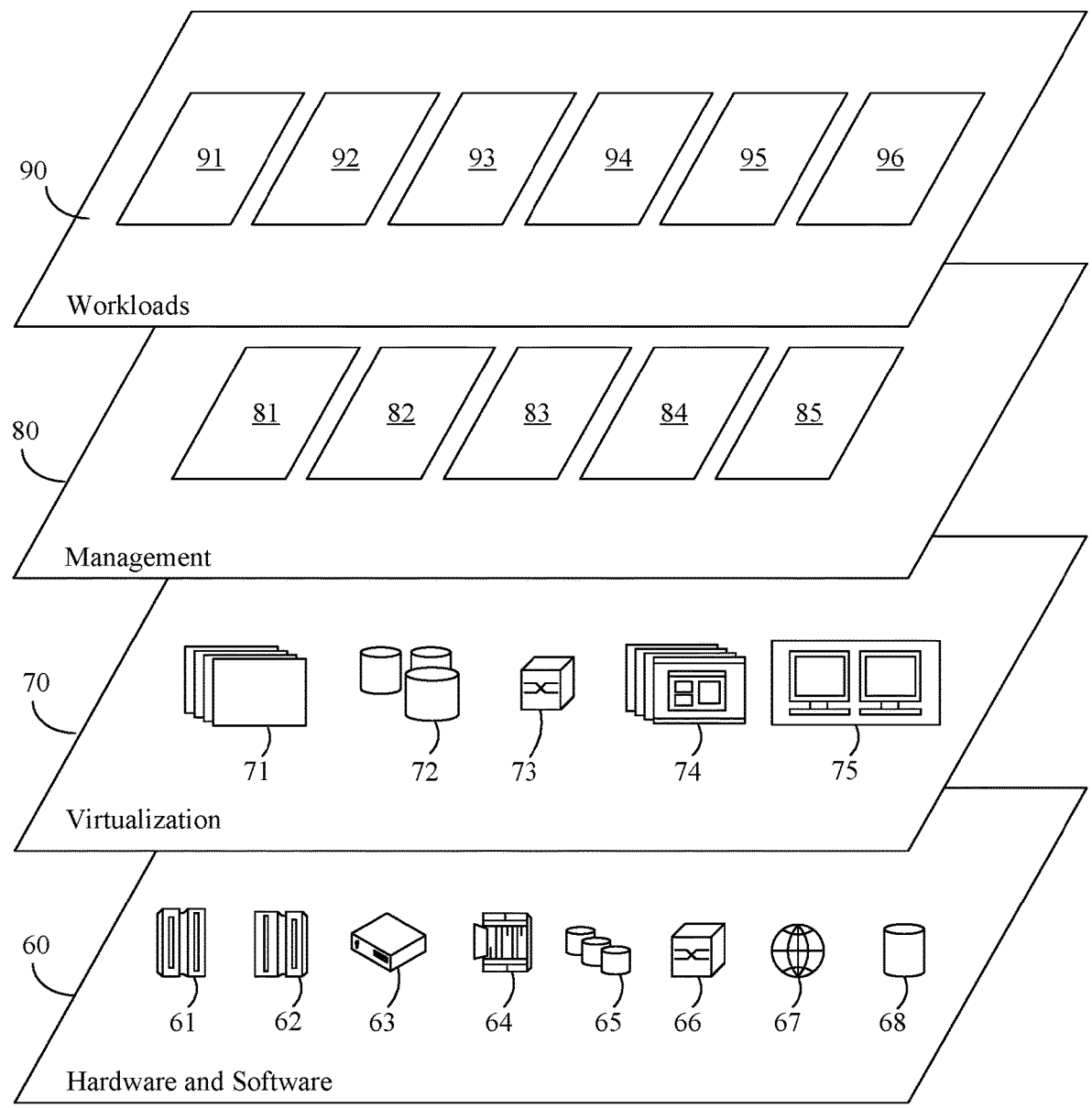
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. The networking components 66 can comprise, for example, network adapters, switches, routers, etc.

In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing and user space communication session encryption initialization 96.

User space communication session encryption initialization 96 can be used to generate Private session keys for data communication sessions, and store the Private session keys on network adapters in the hardware and software layer 60. The network adapters can perform data encryption and decryption for communication sessions using the Private session keys. Accordingly, computing resources provided by the virtualization layer 70 and management layer are freed from being tasked with performing such encryption and decryption.

Figure 3:
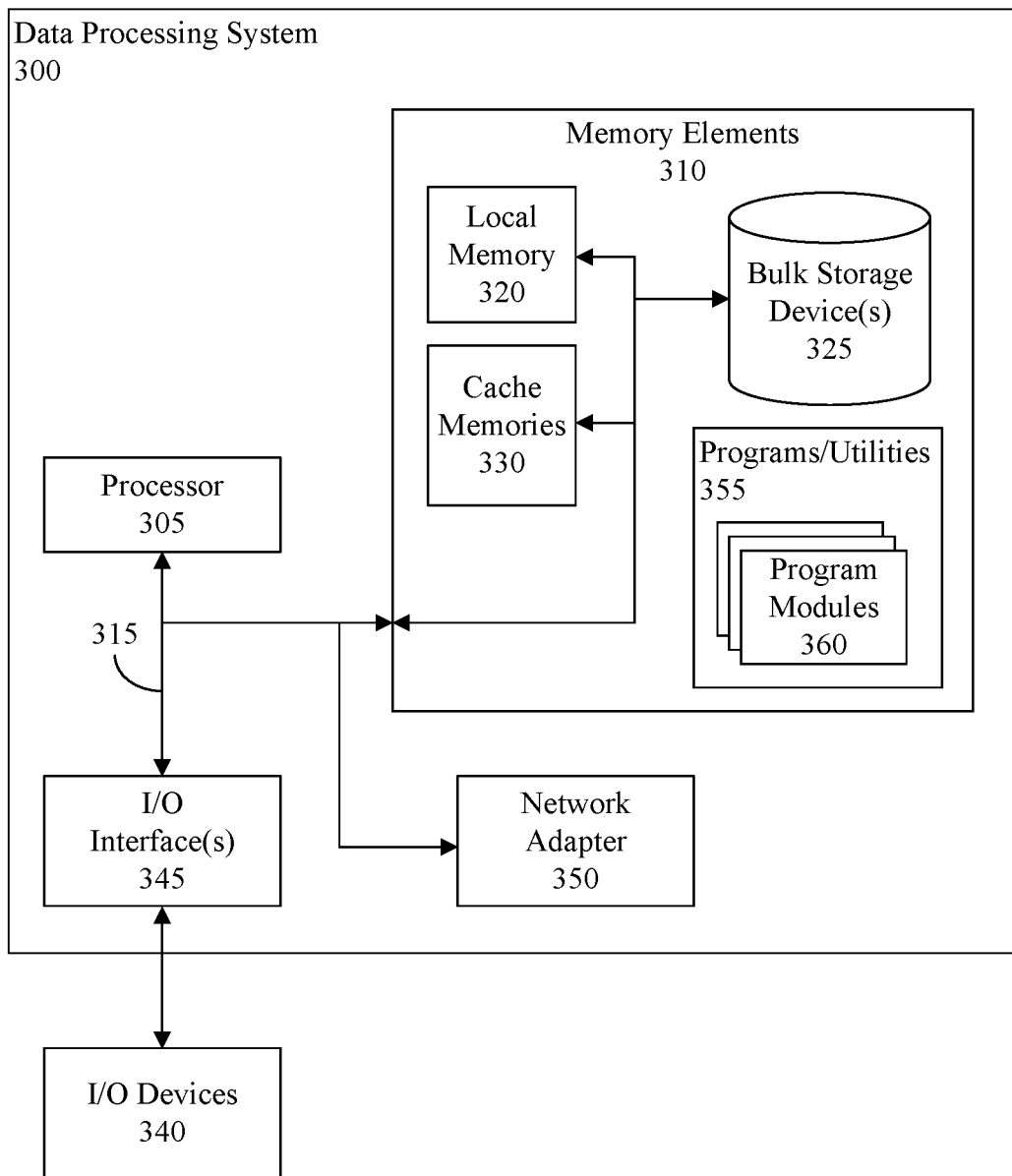
FIG. 3 depicts a block diagram illustrating example architecture for a data processing system.

FIG. 3 depicts a block diagram illustrating example architecture for a data processing system 300, which can be implemented at the hardware and software layer 60 of the cloud computing environment 50. The data processing system 300 can include at least one processor 305 (e.g., a central processing unit) coupled to memory elements 310 through a system bus 315 or other suitable circuitry. As such, the data processing system 300 can store program code within the memory elements 310. The processor 305 can execute the program code accessed from the memory elements 310 via the system bus 315. It should be appreciated that the data processing system 300 can be implemented in the form of any system including a processor and memory that is capable of performing the functions and/or operations described within this specification. For example, the data processing system 300 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 300 also can include one or more cache memories (330) that provide temporary storage of at least some program code in order to reduce the number of times program code must be retrieved from the local memory 320 and/or bulk storage device 325 during execution.

Input/output (I/O) devices 340, such as a display, a pointing device, a keyboard, etc. can be coupled to the data processing system 300. The I/O devices 340 can be coupled to the data processing system 300 either directly or through intervening I/O interfaces 345. One or more network adapters 350 also can be coupled to data processing system 300 to enable the data processing system 300 to become coupled to other systems, computer systems, remote printers, and/or remote storage devices through intervening private or public networks. Modems, cable modems, transceivers, and Ethernet cards are examples of different types of network adapters 350 that can be used with the data processing system 300. A network adapter 350 can be internal to the data processing system 300, or external to the data processing system 300 and communicatively linked to the data processing system 300 via a suitable I/O device 340.

As pictured in FIG. 3, the memory elements 310 can store the components of the system, namely one or more programs/utilities 355, each of which may comprise one or more program modules 360. The program/utilities 355 can include, for example, an application that performs user space communication session encryption initialization 96. Being implemented in the form of executable program code, the programs/utilities 355 can be executed by the data processing system 300 and, as such, can be considered part of the data processing system 300. Moreover, the programs/utilities 355 include functional data structures that impart functionality when employed as part of the data processing system 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Figure 4:
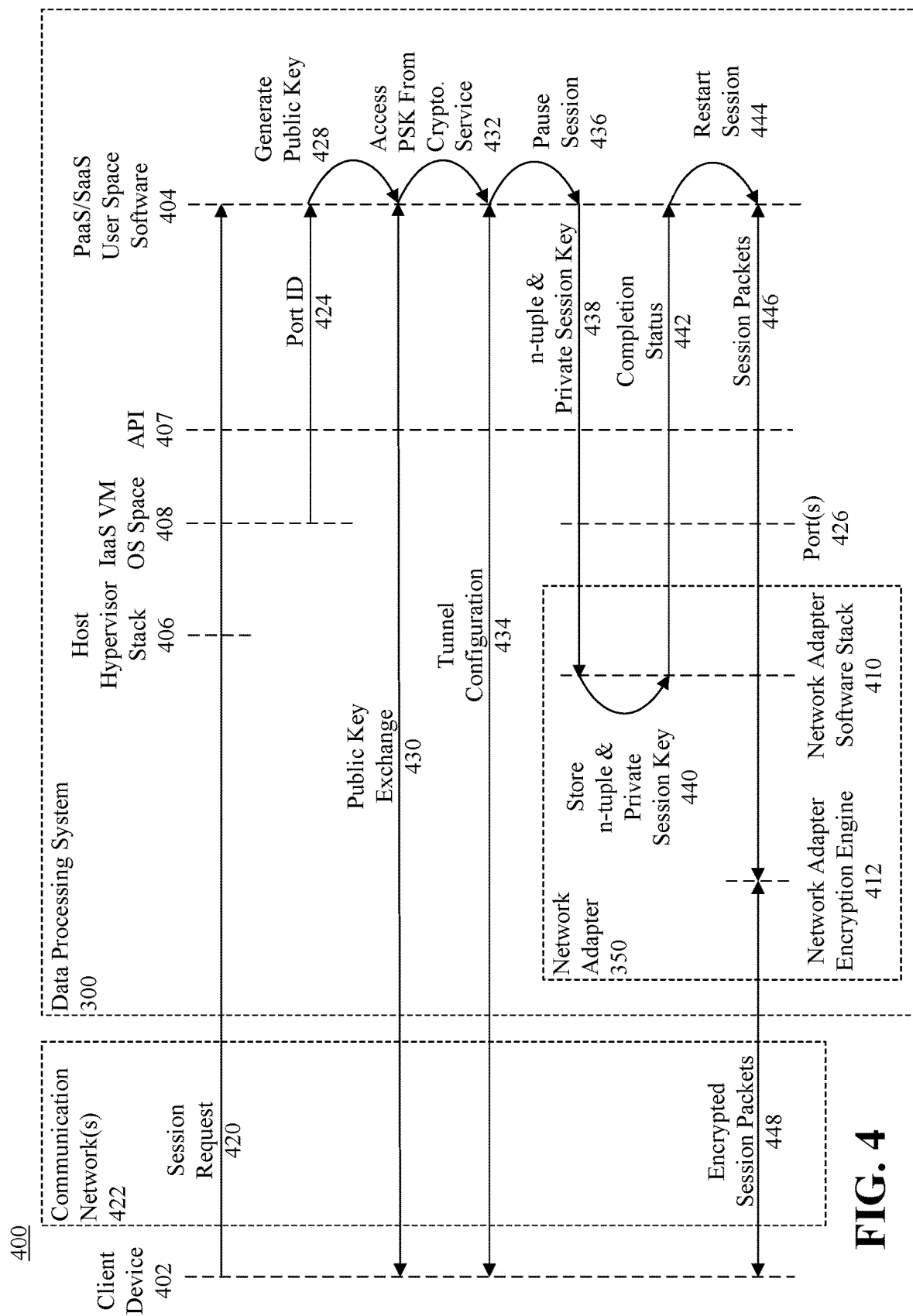
FIG. 4 depicts a flow diagram illustrating an example of performing user space communication session encryption initialization.

FIG. 4 depicts a flow diagram 400 illustrating an example of performing user space communication session encryption initialization 96. The user space communication session encryption initialization 96 can be implemented by the data processing system 300 of FIG. 3, for example in accordance with Internet Protocol Security (IPSec). The data processing system 300 can be configured to provide Platform as a Service (PaaS) and/or Software as a Service (SaaS) user space software to client devices, including a client device 402. In this regard, the data processing system 300 can allocate a portion of the memory elements 310 for user space, for example to store PaaS and/or SaaS user space software 404. The PaaS and/or SaaS user space software 404 can be assigned to virtual machine (VM) hosted by the data processing system 300, but stored and executed in user space memory separate from memory assigned to a host hypervisor stack 406, memory assigned to an Infrastructure as a Service (Iaas) VM operating system space 408, and memory assigned to the operating system space (e.g., kernel space) of the data processing system 300. The PaaS and/or SaaS user space software 404 can be managed, for example, using a container.

An application programming interface (API) 407 also can be provided by the data processing system 300. In illustration, if the PaaS and/or SaaS user space software 404 is hosted in a VM, the API 407 can be a function provided by an I/O virtualization framework for use by the PaaS and/or SaaS user space software 404 to access the network adapter 350. The hypervisor can emulate the network adapter 350 and provide, in the VM, the API 407 to be used for communication between the PaaS and/or SaaS user space software 404 and the network adapter 350. By way of example, Virtio is an I/O virtualization framework provided for use with the Kernel-based Virtual Machine (KVM) virtualization module for the Linux operating system. Virtio can emulate the network adapter 350, and provide the API 407 for communication between the PaaS and/or SaaS user space software 404 and the network adapter 350.

As noted, the data processing system 300 can include a network adapter 350 (FIG. 3). The network adapter 350 can be a smart network adapter, and can include a network adapter software stack 410. In illustration, the network adapter 350 can be a smart network interface card (SmartNIC) that supports Software-Defined Networking (SDN). A SmartNIC is a network adapter that offloads processing tasks the processor 305 of the data processing system 300 normally would handle, such as performing encryption/decryption, performing firewall operations, and implementing communication processing. The communication processing can include transmission Control Protocol/Internet Protocol (TCP/IP) communication processing, Hypertext Transfer Protocol (HTTP) communication processing, Datagram Transport Layer Security protocol (DTLS) communication processing and/or Quick UDP Internet Connection protocol (QUIC) communication processing. A network adapter 350 can be internal to the data processing system 300, or external to the data processing system 300 and communicatively linked to the data processing system 300 via a suitable I/O device 340.

The network adapter 350 also can include an encryption engine 412 configured to encrypt and decrypt data packets, as will be described. The network adapter 350 also can include a communication interface (not shown), for example a PCI Express interface or other suitable interface, configured to communicate with the data processing system 300. The network adapter 350 also can include a communication interface (not shown) configured to communicate via one or more communication networks. By way of example, the network adapter 350 can include an Ethernet port or a wireless communication (e.g., WiFi) port.

In operation, the data processing system 300 can execute a program/utility 355 (FIG. 3) hosted in the PaaS and/or SaaS user space software 404, and that performs user space communication session encryption initialization 96 in the user space. The data processing system 300 can receive from the client device 402 a session request 420 via one or more communication networks 422 (e.g., via the Internet) requesting access to the PaaS and/or SaaS user space software 404, for example to access one or more applications/services, via a communication session. In response to the session request 420, the program/utility 355 can determine, in real time, one or more port identifiers (port IDs) 424 for one or more ports 426 provided by the IaaS VM operating system space 408 to be used by the PaaS and/or SaaS user space software 404 for the communication session. One or more of the ports 426 can be, for example, User Datagram Protocol/Internet Protocol (UDP/IP) ports. In one or more arrangements, the program/utility 355 can request the port IDs 424 from the IaaS VM operating system space 408, which can assign those port IDs 424 to the communication session, but the present arrangements are not limited in this regard. For example, the port IDs 424 can be assigned to the PaaS and/or SaaS user space software 404 a priori and known to the program/utility 355. In illustration, a first port ID 424 can indicate a first port 426 (e.g., outbound port) to which the PaaS and/or SaaS user space software 404 is to communicate UDP datagrams to the Network adapter 350, and a second port ID 424 can indicate a second port 426 (e.g., inbound port) on which the PaaS and/or SaaS user space software 404 listens for UDP datagrams generated by the Network adapter 350. In another example, a first port ID 424 can indicate a first port 426 (e.g., outbound port) to which the PaaS and/or SaaS user space software 404 is to communicate with the network adapter 350 via an API 407, and a second port ID 424 can indicate a second port 426 (e.g., inbound port) on which the PaaS and/or SaaS user space software 404 listens for data communicated by the network adapter 350 to the PaaS and/or SaaS user space software 404 via the API 407.

Responsive to determining the port ID 424, the program/utility 355, at step 428 the program/utility 355, operating in the PaaS and/or SaaS user space software 404, can generate, in real time, a public key and perform, in real time, a public key exchange 430 with the client device 402. In one or more arrangements, the public key exchange 430 can be performed in accordance with phase 1 of the Internet Key Exchange (IKE) protocol, for example IKE or IKE2.

In illustration, the public key exchange 430 can be performed using IKE Phase 1 main mode, using a plurality of exchanges between the PaaS and/or SaaS user space software 404 (e.g., the program/utility 355) and the client device 402, to negotiate a secured association (SA). Specifically, phase 1 can including negotiation of a SA. IKE Phase 1 main mode can include: an initial exchange between the PaaS and/or SaaS user space software 404 (e.g., program/utility 355) and client device 402 of at least one algorithm and at least one hash to be used to secure communications; a Diffie-Hellman public key exchange between the PaaS and/or SaaS user space software 404 (e.g., program/utility 355) and client device 402 to generate shared secret keying material used to generate a at least one shared secret key and, passing of nounces (e.g., random numbers) from the PaaS and/or SaaS user space software 404 to the client device 402, which are signed and returned by the client device 402 to verify user identity; and device identity authentication, for example by the PaaS and/or SaaS user space software 404 and client device 402 exchanging IP addresses to be used for the communication session in encrypted form (e.g., by encrypting the IP addresses using the generated shared secret keys). The PaaS and/or SaaS user space software 404 and the client device 402 each can generate respective public keys to be exchanged during the Diffie-Hellman public key exchange using their respective private keys, the algorithm and the hash determined during the initial exchange.

The public key exchange 430 also can be performed using IKE Phase 1 aggressive mode. IKE Phase 1 aggressive mode can include the exchange of information explained above for main mode, but the information can be exchanged using fewer exchanges. For example, the PaaS and/or SaaS user space software 404 (e.g., the program/utility 355) can communicate to the client device 402 a message including the algorithm, hash, a Diffie-Hellman public key, a nounce and an identity packet. The client device 402 can respond with a message completing the exchange, and PaaS and/or SaaS user space software 404 (e.g., the program/utility 355) can confirm the exchange.

Regardless of whether IKE Phase 1 main mode or aggressive mode is used for the public key exchange, the public keys will not be known to, nor discovered by, the host hypervisor stack 406, the IaaS VM operating system space 408 nor the operating system of the data processing system 300. This improves security by reducing the risk of an unscrupulous party obtaining the public keys from the hypervisor stack 406 or the IaaS VM operating system space 408, which otherwise could be used to decrypt data exchanged during configuration of the secure communication tunnel. Completion of the public key exchange 430 can result in the establishment of a secure communication tunnel (e.g., IPSec tunnel) between the PaaS and/or SaaS user space software 404 and the client device 402.

In the above examples, the program/utility 355 can operate in the PaaS and/or SaaS user space software 404 to initiate establishment and configuration of a secure tunnel in accordance with IKE. Still, the program/utility 355 can implement any other suitable key exchange protocol and the present arrangements are not limited in this regard.

At step 432 the program/utility 355 can access, in real time, a private session key from a cryptographic service. The cryptographic service also can provide a hardware security module (HSM) that provides capability to use a private session key for cloud data encryption. An example of a suitable cryptographic service is IBM® Cloud® Hyper Protect Crypto Services (HPCS) available from International Business Machines of Armonk, NY. In one or more arrangements, the program/utility 355 can use an API, different than the API 407, to initiate the cryptographic service to generate and/or otherwise provide the private session key, for example using the PKCS #11 API or the GREP11 API, both of which are available from the GitHub repository.

Figure 5:
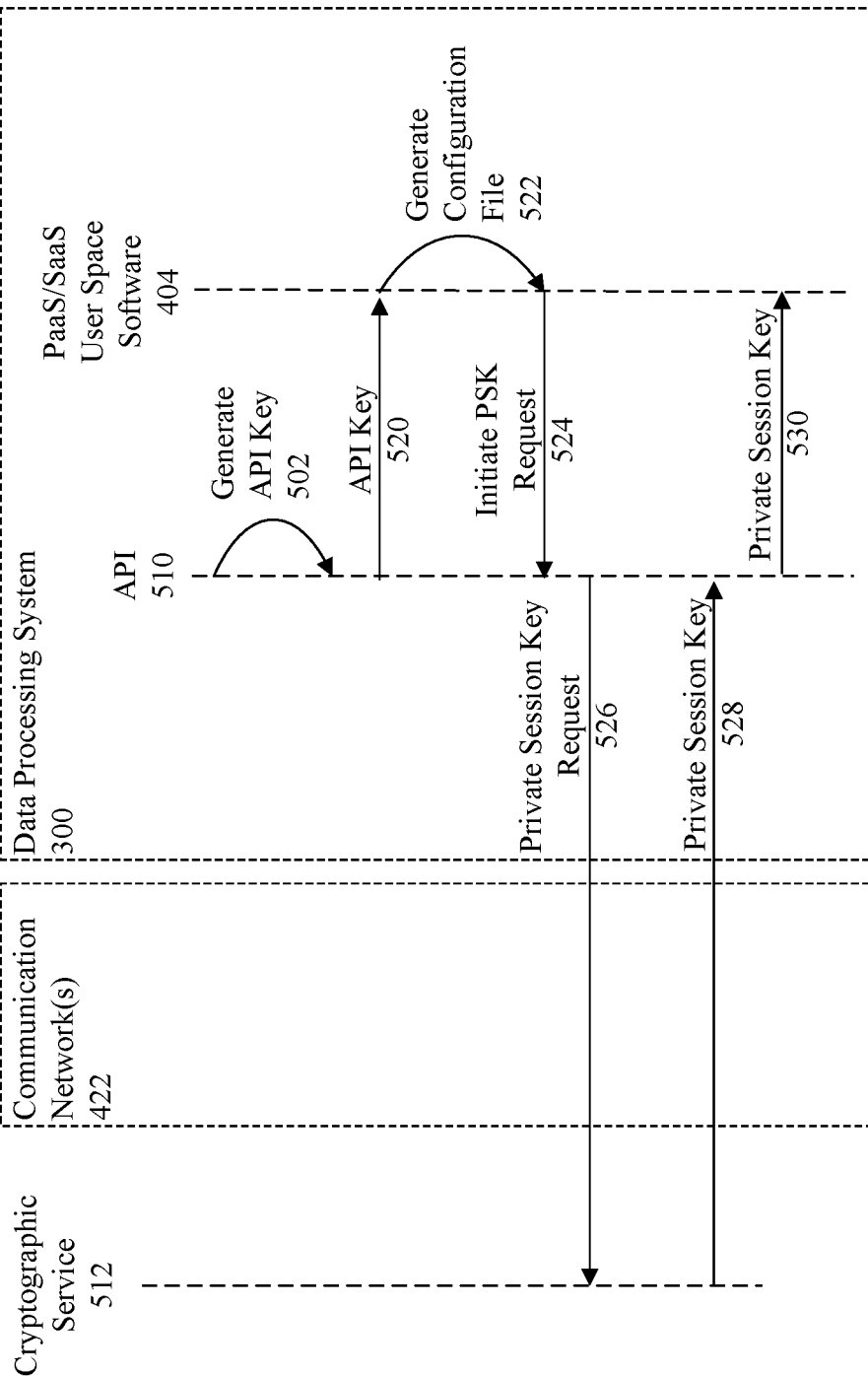
FIG. 5 depicts a flow diagram illustrating an example of accessing a private session key.

FIG. 5 depicts a flow diagram 500 illustrating an example of accessing a private session key, for example from a cryptographic service. The flow diagram can be implemented at step 432. At step 502 an API 510 (e.g., the PKCS #11 API or the GREP11 API) can generate an API Key to be used to access a cryptographic service instance from the cryptographic service 512. At step 520 the PaaS and/or SaaS user space software 404 (e.g., program/utility 355) can access the API key from the API 510.

At step 522, the PaaS and/or SaaS user space software 404 (e.g., program/utility 355) can generate a configuration file that provisions a virtual private cloud (VPC) instance with the cryptographic service 512, enable a private endpoint for the VPC instance, and create a cryptographic service endpoint gateway. The configuration file can include the API key, an instance identifier for an instance of a cryptographic service instance, a uniform resource locator (URL) of the endpoint address of the VPC instance, and a port number of the endpoint address of the VPC instance.

At step 524 the PaaS and/or SaaS user space software 404 (e.g., program/utility 355) can initiate a private session key request, for example by passing the configuration file to the API 510. In response, at step 526 the API 510 can establish a secure VPC instance with the cryptographic service 512 and request a private session key. In response to the request, at step 528 the cryptographic service 512 can communicate the private session key to the API 510 in the VPC instance. Responsive to receiving the private session key, at step 530 the API 510 can pass the private session key to the PaaS and/or SaaS user space software 404.

Referring again to FIG. 4, the program/utility 355 can initiate, in real time, operations to implement tunnel configuration 434 using the private session key accessed from the cryptographic service 512. In this regard, it should be noted that step 432 can be performed at any time before step 434, for example prior to or in parallel with receiving the port identifier 424, prior to or in parallel with the public key exchange 430, etc.

In one or more arrangements, the tunnel configuration 434 can be performed in accordance with phase 2 of the IKE protocol. In illustration, the PaaS and/or SaaS user space software 404 (e.g., the program/utility 355) and client device 402 can communicate via the tunnel, using the negotiated SA, to negotiate a shared IPSec policy, device shared secret keying material used for an IPSec security algorithm, and establish IPSec SAs. Further, the program/utility 355 and the client device 402 can exchange nonces that provide replay protection, that are used to generate new secret key material, and prevent replay attacks from generating fraudulent SAs. Responsive to the secure tunnel being established, at step 436 the program/utility 355 can pause the communication session.

Responsive to the communication session being paused at step 436, at step 438 the program/utility 355 can communicate, in real time, to the network adapter 350 a n-tuple (e.g., TCP/IP twintuple or a TCP/IP quintuple) and the private session key. In illustration, the program/utility 355 can communicate to the network adapter 350 the configuration file comprising the Private session key. In one or more arrangements, the program/utility 355 can communicate the n-tuple and private session key to the network adapter 350, via the port 426 (e.g., first port) indicated by the port ID 424, in at least one User Datagram Protocol (UDP) datagram. In one or more other arrangements, if the PaaS and/or SaaS user space software 404 is hosted in a VM, the program/utility 355 can communicate the n-tuple and private session key to the network adapter 350 via the API 407.

The n-tuple can include data indicating a source IP address and a destination IP address. Optionally, the n-tuple further can include data indicating a source port, a destination port and/or a communication protocol. The source IP address can be the IP address assigned to the PaaS and/or SaaS user space software 404. The destination IP address can be an IP address assigned to the client device 402. The source port can be an outbound port 426 (e.g., first port 426), indicated by the Port ID 424, to be used by the PaaS and/or SaaS user space software 404 (e.g., via the API 407 in one or more arrangements) to exchange session packets 446 with the client device 402. The destination port can be a port of the client device 402 through which the PaaS and/or SaaS user space software 404 can communicate with the client device 402 using the secure tunnel. The communication protocol can be the communication protocol (e.g., TCP/IP, DTLS, and/or QUIC) used for the communications between the PaaS and/or SaaS user space software 404 and the client device 402. Optionally, the n-tuple also can include a uni-directional session identifier (ID) (e.g., a Security Parameter Index for IPsec) for the communication session, the PaaS and/or SaaS user space software 404 (e.g., the program/utility 355) can communicate, in real time, to the network adapter 350 another UDP datagram indicating the session ID, or the PaaS and/or SaaS user space software 404 (e.g., the program/utility 355) can communicate the session ID, in real time, to the network adapter 350 via the API 407.

At step 440 the network adapter 350 can store, in real time, the n-tuple in association with the Private session key in the network adapter software stack 410. For example, the network adapter 350 can generate and store data linking the n-tuple with the Private session key. Responsive to storing the n-tuple and Private session key, the network adapter 350 can communicate, in real time, to the PaaS and/or SaaS user space software 404 (e.g., the program/utility 355) a completion status message 442 indicating that reception and storage of the n-tuple and Private session key by the network adapter 350 is complete. In one or more arrangements, the completion status message can be communicated via a port 426 (e.g., the second port 426) on which the PaaS and/or SaaS user space software 404 is listening, as a UDP datagram. In one or more other arrangements, the completion status message can be communicated to the PaaS and/or SaaS user space software 404 via the network adapter 350 and the API 407.

Because the n-tuple and the private session key are communicated from the PaaS and/or SaaS user space software 404 to the network adapter 350 in one or more UDP datagrams or via the API, and stored by the network adapter 350 rather than by the processor 305, the n-tuple and the private session key will not be known to, nor discovered by, the host hypervisor stack 406, the IaaS VM operating system space 408 nor the operating system of the data processing system 300. Again, this improves security by reducing the risk of an unscrupulous party obtaining the n-tuple and the private session key from the hypervisor stack 406 or the IaaS VM operating system space 408, which otherwise could be used to decrypt session packets exchanged during the communication session.

In response to receiving the completion status message 442, at step 444 the PaaS and/or SaaS user space software 404 (e.g., the program/utility 355 hosted in PaaS and/or SaaS user space software 404) can restart, in real time, the communication session with the client device 402, including exchange of session packets 446.

For outbound session packets, the PaaS and/or SaaS user space software 404 can communicate the session packets 446, via a port 426 (e.g., the first port 426), to the network adapter 350. In one or more arrangements, the PaaS and/or SaaS user space software 404 can communicate the session packets 446 to the API 407, and the API can communicate the session packets 446 to the network adapter 350 via the port 426. The network adapter 350 can invoke the network adapter encryption engine 412 to encrypt the outbound session packets 446 as encrypted session packets 448 using the Private session key, and communicate encrypted session packets 448 to the client device 402, for example using TCP/IP, DTLS, and/or QUIC. In illustration, the network adapter 350 can encrypt the session packets 448, using the Private session key, in accordance with the Advanced Encryption Standard (AES), and communicate, in real time, encrypted session packets 448 to the destination IP address indicated by the n-tuple using the communication protocol indicated by the n-tuple using the secure communication tunnel.

The network adapter 350 also can receive inbound encrypted session packets 448 from the client device 402 using the secure communication tunnel, for example using TCP/IP, DTLS, and/or QUIC. The network adapter 350 can invoke, in real time, the network adapter encryption engine 412 to decrypt the inbound session packets 448 using the Private session key, for example in accordance with AES. The network adapter 350 can identify the Private session key by identifying the IP address from which the inbound encrypted session packets 448 are received, identifying the n-tuple that includes that IP address, and determine the Private session key that is associated with that n-tuple. The network adapter 350 can communicate, in real time, the decrypted session packets 446 to the PaaS and/or SaaS user space software 404, via the port 426, as session packets 446. In one or more arrangements, the API 407 can listen on the port 426 (e.g., the second port 426) for the session packets 446 and communicate the session packets 446 to the PaaS and/or SaaS user space software 404.

At this point it should be noted that since the encryption/decryption is performed by the network adapter encryption engine 412, the volume of operations performed by the processor 305 is reduced in comparison to the processor 305 performing the encryption/decryption (e.g., using the host hypervisor stack and/or IaaS VM operating system space 408). This improves the processor's operating efficiency and improves performance of the data processing system 300.

From time to time the PaaS and/or SaaS user space software 404 (e.g., the program/utility 355) can determine that the Private session key is to be changed. To do so, the PaaS and/or SaaS user space software 404 can return to step 428 and generate a new public key, and again perform the operations described at steps 430-444. The PaaS and/or SaaS user space software 404 can determine to change the Private session key at periodic intervals (e.g., every hour, every six hours, every day, etc.) or in response to detecting an event, for example the communication session continuing after a period of inactivity in the communication session exceeding a threshold value.

Figure 6:
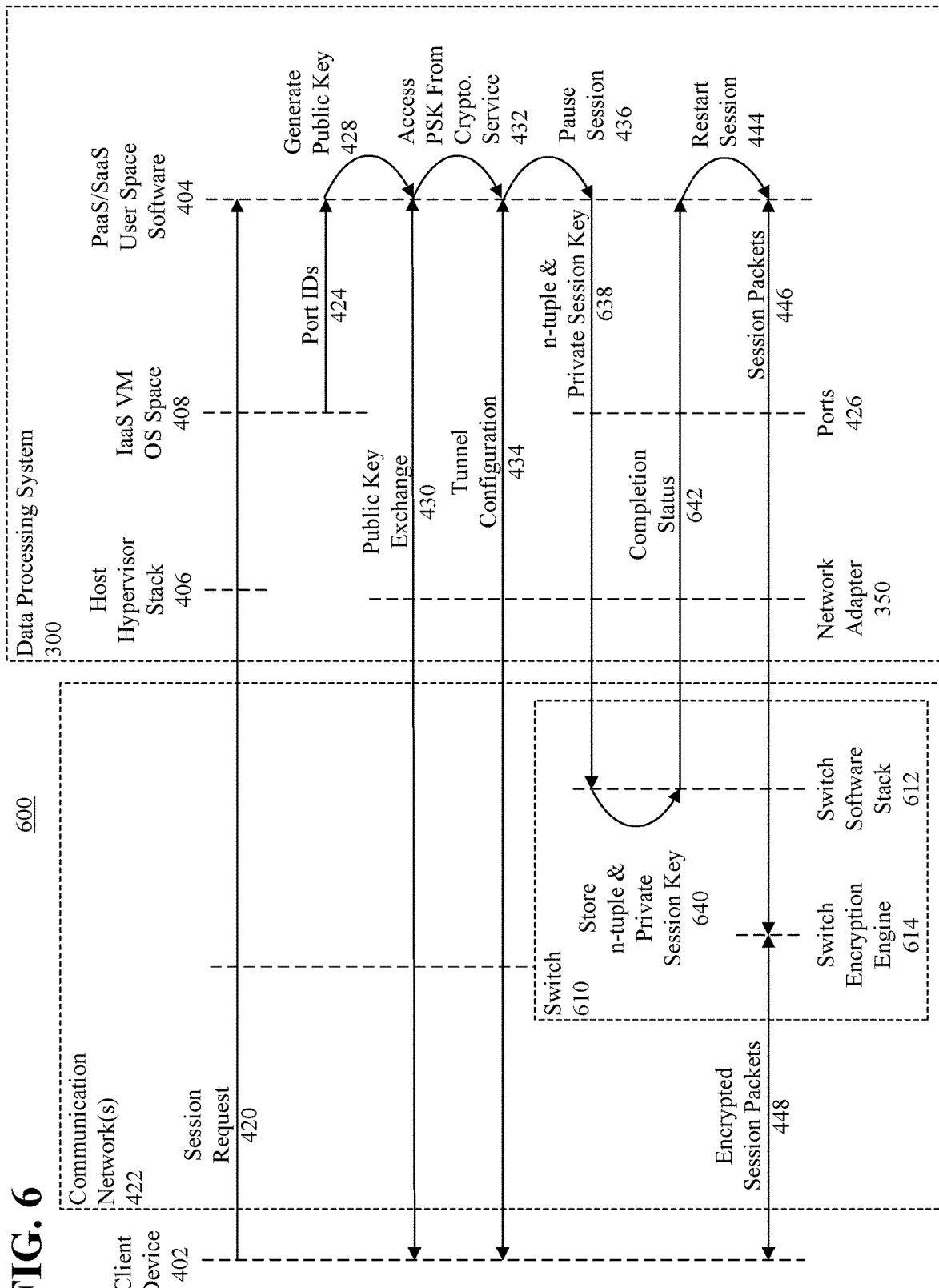
FIG. 6 depicts a flow diagram illustrating another example of performing user space communication session encryption initialization.

FIG. 6 depicts a flow diagram 600 illustrating another example of performing user space communication session encryption initialization 96. In this example, a switch 610 can be used to perform the encryption/description of the session packets 446. The switch 610 can be a component of the communication network(s) 422 to which the data processing system 300 is communicatively linked via the network adapter 350. For example, the switch 610 can be a component of a local area network (LAN) or a wide area network (WAN) to which the data processing system 300 is communicatively linked via the network adapter 350. In this example, the network adapter 350 need not include the encryption engine 412 and software stack 410, though the present example is not limited in this regard.

In illustration, the switch 610 can be a Software-Defined Networking (SDN) switch or smart switch that supports SDN, and can include a switch software stack 612. In illustration, the switch 610 can offload processing tasks the processor 305 of the data processing system 300 normally would handle, such as performing encryption/decryption, performing firewall operations, and implementing communication processing. The communication processing can include TCP/IP communication processing, HTTP communication processing, DTLS communication processing and/or QUIC communication processing.

The switch 610 can include a switch encryption engine 614 configured to encrypt and decrypt data packets, as will be described. The switch 610 also can include communication ports (not shown) configured to communicate via one or more communication networks. By way of example, the switch 610 can include one or more Ethernet ports and/or one or more a wireless communication (e.g., WiFi) ports.

In operation, the data processing system 300 can execute a program/utility 355 (FIG. 3) hosted in the PaaS and/or SaaS user space software 404, and that performs user space communication session encryption initialization 96 in the user space. The data processing system 300 can receive from the client device 402 a session request 420 via one or more communication networks 422 (e.g., via the Internet) requesting access to the PaaS and/or SaaS user space software 404, for example to access one or more applications/services, via a communication session. In response to the session request 420, the program/utility 355 can determine, in real time, one or more port identifiers (port IDs) 424 for one or more ports 426 provided by the IaaS VM operating system space 408 to be used by the PaaS and/or SaaS user space software 404 for the communication session.

One or more of the ports 426 can be, for example, User Datagram Protocol/Internet Protocol (UDP/IP) ports. In one or more arrangements, the program/utility 355 can request the port IDs 424 from the IaaS VM operating system space 408, which can assign those port IDs 424 to the communication session, but the present arrangements are not limited in this regard. For example, the port IDs 424 can be assigned to the PaaS and/or SaaS user space software 404 a priori and known to the program/utility 355. In illustration, a first port ID 424 can indicate a first port 426 (e.g., outbound port) to which the PaaS and/or SaaS user space software 404 is to communicate UDP datagrams to the switch 610, and a second port ID 424 can indicate a second port 426 (e.g., inbound port) on which the PaaS and/or SaaS user space software 404 listens for UDP datagrams generated by the switch 610. In another example, a first port ID 424 can indicate a first port 426 (e.g., outbound port) to which the PaaS and/or SaaS user space software 404 is to communicate with the switch 610 via an API 407, and a second port ID 424 can indicate a second port 426 (e.g., inbound port) on which the PaaS and/or SaaS user space software 404 listens for data communicated by the switch 610 to the PaaS and/or SaaS user space software 404 via the API 407.

Responsive to determining the port ID 424, at step 428 the program/utility 355, operating in the PaaS and/or SaaS user space software 404, can generate, in real time, a public key and perform, in real time, a public key exchange 430 with the client device 402. In one or more arrangements, the public key exchange 430 can be performed in accordance with phase 1 of the Internet Key Exchange (IKE) protocol, for example IKE or IKE2.

In illustration, the public key exchange 430 can be performed using IKE Phase 1 main mode, using a plurality of exchanges between the PaaS and/or SaaS user space software 404 (e.g., the program/utility 355) and the client device 402, to negotiate a secured association (SA). Specifically, phase 1 can including negotiation of a SA. IKE Phase 1 main mode can include: an initial exchange between the PaaS and/or SaaS user space software 404 (e.g., program/utility 355) and client device 402 of at least one algorithm and at least one hash to be used to secure communications; a Diffie-Hellman public key exchange between the PaaS and/or SaaS user space software 404 (e.g., program/utility 355) and client device 402 to generate shared secret keying material used to generate a at least one shared secret key and, passing of nounces (e.g., random numbers) from the PaaS and/or SaaS user space software 404 to the client device 402, which are signed and returned by the client device 402 to verify user identity; and device identity authentication, for example by the PaaS and/or SaaS user space software 404 and client device 402 exchanging IP addresses to be used for the communication session in encrypted form (e.g., by encrypting the IP addresses using the generated shared secret keys). The PaaS and/or SaaS user space software 404 and the client device 402 each can generate respective public keys to be exchanged during the Diffie-Hellman public key exchange using their respective private keys, the algorithm and the hash determined during the initial exchange.

The public key exchange 430 also can be performed using IKE Phase 1 aggressive mode. IKE Phase 1 aggressive mode can include the exchange of information explained above for main mode, but the information can be exchanged using fewer exchanges. For example, the PaaS and/or SaaS user space software 404 (e.g., the program/utility 355) can communicate to the client device 402 a message including the algorithm, hash, a Diffie-Hellman public key, a nounce and an identity packet. The client device 402 can respond with a message completing the exchange, and PaaS and/or SaaS user space software 404 (e.g., the program/utility 355) can confirm the exchange.

Regardless of whether IKE Phase 1 main mode or aggressive mode is used for the public key exchange, the public keys will not be known to, nor discovered by, the host hypervisor stack 406, the IaaS VM operating system space 408 nor the operating system of the data processing system 300. This improves security by reducing the risk of an unscrupulous party obtaining the public keys from the hypervisor stack 406 or the IaaS VM operating system space 408, which otherwise could be used to decrypt data exchanged during configuration of the secure communication tunnel. Completion of the public key exchange 430 can result in the establishment of a secure communication tunnel (e.g., IPSec tunnel) between the PaaS and/or SaaS user space software 404 and the client device 402.

In the above examples, the program/utility 355 can operate in the PaaS and/or SaaS user space software 404 to initiate establishment and configuration of a secure tunnel in accordance with IKE. Still, the program/utility 355 can implement any other suitable key exchange protocol and the present arrangements are not limited in this regard.

At step 432 the program/utility 355 can access, in real time, a private session key from a cryptographic service. The cryptographic service also can provide a hardware security module (HSM) that provides capability to use a private session key for cloud data encryption. An example of a suitable cryptographic service is IBM® Cloud® Hyper Protect Crypto Services (HPCS) available from International Business Machines of Armonk, NY. In one or more arrangements, the program/utility 355 can use an API, different than the API 407, to initiate the cryptographic service to generate and/or otherwise provide the private session key, for example using the PKCS #11 API or the GREP11 API, both of which are available from the GitHub repository. In one or more arrangements, step 432 can be implemented in accordance with the flow diagram 500 of FIG. 5.

The program/utility 355 can initiate, in real time, operations to implement tunnel configuration 434 using the private session key accessed from the cryptographic service 512. In this regard, it should be noted that step 432 can be performed at any time before step 434, for example prior to or in parallel with receiving the port identifier 424, prior to or in parallel with the public key exchange 430, etc.

In one or more arrangements, the tunnel configuration 434 can be performed in accordance with phase 2 of the IKE protocol. In illustration, the PaaS and/or SaaS user space software 404 (e.g., the program/utility 355) and client device 402 can communicate via the tunnel, using the negotiated SA, to negotiate a shared IPSec policy, device shared secret keying material used for an IPSec security algorithm, and establish IPSec SAs. Further, the program/utility 355 and the client device 402 can exchange nonces that provide replay protection, that are used to generate new secret key material, and prevent replay attacks from generating fraudulent SAs. Responsive to the secure tunnel being established, at step 436 the program/utility 355 can pause the communication session.

Responsive to the communication session being paused at step 436, at step 638 the program/utility 355 can communicate, in real time, to the switch 610 a Transmission Control Protocol/Internet Protocol n-tuple (e.g., a TCP/IP twintuple or a TCP/IP quintuple) and the private session key. In illustration, the program/utility 355 can communicate to the switch 610 the configuration file comprising the Private session key. In one or more arrangements, the program/utility 355 can communicate the n-tuple and private session key to the switch 610, via the port 426 (e.g., first port) indicated by the port ID 424 and the network adapter 350, in at least one User Datagram Protocol (UDP) datagram. In one or more other arrangements, if the PaaS and/or SaaS user space software 404 is hosted in a VM, the program/utility 355 can communicate the n-tuple and private session key to the switch 610 via the API 407, which can communicate the n-tuple to the switch 610 via the network adapter 350.

The n-tuple can include data indicating a source IP address and a destination IP address. Optionally, the n-tuple further can include data indicating a source port, a destination port and/or a communication protocol. The source IP address can be the IP address assigned to the PaaS and/or SaaS user space software 404. The destination IP address can be an IP address assigned to the client device 402. The source port can be an outbound port 426 (e.g., first port 426), indicated by the Port ID 424, to be used by the PaaS and/or SaaS user space software 404 (e.g., via the API 407 in one or more arrangements) to exchange session packets 446 with the client device 402. The destination port can be a port of the client device 402 through which the PaaS and/or SaaS user space software 404 can communicate with the client device 402 using the secure tunnel. The communication protocol can be the communication protocol (e.g., TCP/IP, DTLS, and/or QUIC) used for the communications between the PaaS and/or SaaS user space software 404 and the client device 402. Optionally, the n-tuple also can include a uni-directional session identifier (ID) (e.g., a Security Parameter Index for IPsec) for the communication session, the PaaS and/or SaaS user space software 404 (e.g., the program/utility 355) can communicate, in real time, to the switch 610 another UDP datagram indicating the session ID, or the PaaS and/or SaaS user space software 404 (e.g., the program/utility 355) can communicate the session ID, in real time, to the switch 610 via the API 407.

At step 640 the switch 610 can store, in real time, the n-tuple in association with the Private session key in the switch software stack 612. For example, the switch 610 can generate and store data linking the n-tuple with the Private session key. Responsive to storing the n-tuple and Private session key, the switch 610 can communicate, in real time, to the PaaS and/or SaaS user space software 404 (e.g., the program/utility 355) a completion status message 642 indicating that reception and storage of the n-tuple and Private session key by the switch 610 is complete. In one or more arrangements, the completion status message can be communicated via a port 426 (e.g., the second port 426) on which the PaaS and/or SaaS user space software 404 is listening, as a UDP datagram. In one or more other arrangements, the completion status message can be communicated to the PaaS and/or SaaS user space software 404 via the network adapter 350 and the API 407.

Because the n-tuple and the private session key are communicated from the PaaS and/or SaaS user space software 404 to the switch 610 in one or more UDP datagrams or via the API, and stored by the switch 610 rather than by the processor 305, the n-tuple and the private session key will not be known to, nor discovered by, the host hypervisor stack 406, the IaaS VM operating system space 408 nor the operating system of the data processing system 300. Again, this improves security by reducing the risk of an unscrupulous party obtaining the n-tuple and the private session key from the hypervisor stack 406 or the IaaS VM operating system space 408, which otherwise could be used to decrypt session packets exchanged during the communication session.

In response to receiving the completion status message 642, at step 444 the PaaS and/or SaaS user space software 404 (e.g., the program/utility 355 hosted in PaaS and/or SaaS user space software 404) can restart, in real time, the communication session with the client device 402, including exchange of session packets 446.

For outbound session packets, the PaaS and/or SaaS user space software 404 can communicate the session packets 446, via a port 426 (e.g., the first port), to the switch 610. In one or more arrangements, the PaaS and/or SaaS user space software 404 can communicate the session packets 446 to the API 407, and the API can communicate the session packets 446 to the switch 610 via the port 426. The switch 610 can invoke the switch encryption engine 614 to encrypt the outbound session packets 446 as encrypted session packets 448 using the Private session key, and communicate encrypted session packets 448 to the client device 402. In illustration, the switch 610 can encrypt the session packets 448, using the Private session key, in accordance with the Advanced Encryption Standard (AES), and communicate, in real time, encrypted session packets 448 to the destination IP address indicated by the n-tuple using the communication protocol indicated by the n-tuple using the secure communication tunnel.

The switch 610 also can receive inbound encrypted session packets 448 from the client device 402 using the secure communication tunnel, for example using TCP/IP, DTLS, and/or QUIC. The switch 610 can invoke, in real time, the switch encryption engine 614 to decrypt the inbound session packets 448 using the Private session key, for example in accordance with AES. The switch 610 can identify the Private session key by identifying the IP address from which the inbound encrypted session packets 448 are received, identifying the n-tuple that includes that IP address, and determine the Private session key that is associated with that n-tuple. The switch 610 can communicate, in real time, the decrypted session packets 446 to the PaaS and/or SaaS user space software 404 via the network adapter 350 and port 426 (e.g., the second port 426), as session packets 446. In one or more arrangements, the API 407 can listen on the port 426 for the session packets 446 and communicate the session packets 446 to the PaaS and/or SaaS user space software 404.

At this point it should be noted that since the encryption/decryption is performed by the switch encryption engine 614, the volume of operations performed by the processor 305 is reduced in comparison to the processor 305 performing the encryption/decryption (e.g., using the host hypervisor stack and/or IaaS VM operating system space 408). This improves the processor's operating efficiency and improves performance of the data processing system 300.

From time to time the PaaS and/or SaaS user space software 404 (e.g., the program/utility 355) can determine that the Private session key is to be changed. To do so, the PaaS and/or SaaS user space software 404 can return to step 428 and generate a new public key, and again perform the operations described at steps 430-444. The PaaS and/or SaaS user space software 404 can determine to change the Private session key at periodic intervals (e.g., every hour, every six hours, every day, etc.) or in response to detecting an event, for example the communication session continuing after a period of inactivity in the communication session exceeding a threshold value.

FIG. 7 depicts a flowchart illustrating a method 700 of performing user space communication session encryption initialization. In the following description, the program/utility 355 can be executed by the processor 305 of the data processing system, and hosted in the PaaS and/or SaaS user space software 404. Data storage, encryption and decryption operations performed by the network communication device (e.g., the network adapter 350 or the switch 610) can be performed independent of the processor 305.

At step 702, the program/utility 355 can establish a secure communication tunnel between user space software and a client device.

At step 704, the program/utility 355 can access a private session key from a cryptographic service.

At step 706, the program/utility 355 can communicate, from the user space software to a network communication device, the private session key.

At step 708, program/utility 355 can communicate from the user space software to the network communication device, outbound session packets.

At step 710, the network communication device can generate encrypted outbound session packets by encrypting the outbound session packets using the private session key.

At step 712, the network communication device can communicate, to the client device via the secured communication tunnel, the encrypted outbound session packets.

At step 714, the network communication device can receive from the client device, via the secured communication tunnel, inbound session packets.

At step 716, the network communication device can generate decrypted inbound session packets by decrypting the inbound session packets using the private session key.

At step 718, the network communication device can communicate, to the user space software, the decrypted inbound session packets.

The foregoing description is just an example of embodiments of the invention, and variations and substitutions. While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

establishing a secure communication tunnel between user space software and a client device;

accessing a private session key from a cryptographic service;

communicating, from the user space software to a network communication device, the private session key, wherein the private session key is not known to, nor discovered by, a hypervisor stack nor an operating system space of a data processing system hosting the user space software; and communicating, from the user space software to the network communication device, outbound session packets;

wherein the network communication device is programmed to initiate operations comprising:

generating, by the network communication device, encrypted outbound session packets by encrypting the outbound session packets using the private session key;

communicating, by the network communication device to the client device via the secured communication tunnel, the encrypted outbound session packets;

receiving, by the network communication device from the client device, via the secured communication tunnel, inbound session packets;

generating, by the network communication device, decrypted inbound session packets by decrypting the inbound session packets using the private session key; and communicating, from the network communication device to the user space software, the decrypted inbound session packets.

2. The method of claim 1, further comprising:

receiving from an operating system space a port identifier for a port provided by the operating system space to be used by the user space software for a communication session;

wherein the communicating, from the user space software to the network communication device, the private session key comprises communicating the private session key to the network communication device, via the port identified by the port identifier, in at least one User Datagram Protocol (UDP) datagram.

3. The method of claim 1, wherein communicating, from the user space software to the network communication device, the private session key, comprises communicating the private session key from the user space software to the network communication device via an application programming interface.

4. The method of claim 1, further comprising:

communicating, from the user space software to the network communication device, a n-tuple, the n-tuple comprising data indicating a source IP address and a destination IP address, wherein the network communication device stores the n-tuple in association with the private session key to a software stack of the network communication device.

5. The method of claim 4, further comprising:

receiving, by the user space software from the network communication device, a UDP datagram indicating a completion status indicating that reception and storage of the n-tuple and private session key by the network communication device is complete;

wherein the communicating, from the user space software to the network communication device, the outbound session packets is responsive to the receiving from the network communication device the UDP datagram indicating the completion status indicating that reception and storage of the n-tuple and private session key by the network communication device is complete.

6. The method of claim 4, further comprising:

receiving, by the user space software from the network communication device, via an application programming interface, a completion status indicating that reception and storage of the n-tuple and private session key by the network communication device is complete;

wherein the communicating, from the user space software to the network communication device, the outbound session packets is responsive to the receiving, by the user space software from the network communication device, via the application programming interface, the completion status indicating that reception and storage of the n-tuple and private session key by the network communication device is complete.

7. A system, comprising:

a processor programmed to initiate executable operations comprising:

establishing a secure communication tunnel between user space software and a client device;

accessing a private session key from a cryptographic service;

communicating, from the user space software to a network communication device, the private session key, wherein the private session key is not known to, nor discovered by, a hypervisor stack nor an operating system space of a data processing system hosting the user space software; and communicating, from the user space software to the network communication device, outbound session packets;

wherein the network communication device is programmed to initiate executable operations comprising:

generating, by the network communication device, encrypted outbound session packets by encrypting the outbound session packets using the private session key;

communicating, by the network communication device to the client device via the secured communication tunnel, the encrypted outbound session packets;

receiving, by the network communication device from the client device, via the secured communication tunnel, inbound session packets;

generating, by the network communication device, decrypted inbound session packets by decrypting the inbound session packets using the private session key; and communicating, from the network communication device to the user space software, the decrypted inbound session packets.

8. The system of claim 7, the executable operations further comprising:

receiving from an operating system space a port identifier for a port provided by the operating system space to be used by the user space software for a communication session;

wherein the communicating, from the user space software to the network communication device, the private session key comprises communicating the private session key to the network communication device, via the port identified by the port identifier, in at least one User Datagram Protocol (UDP) datagram.

9. The system of claim 7, wherein communicating, from the user space software to the network communication device, the private session key, comprises communicating the private session key from the user space software to the network communication device via an application programming interface.

10. The system of claim 7, the executable operations further comprising:
communicating, from the user space software to the network communication device, a n-tuple, the n-tuple comprising data indicating a source IP address and a destination IP address, wherein the network communication device stores the n-tuple in association with the private session key to a software stack of the network communication device.

11. The system of claim 10, the executable operations further comprising:
receiving, by the user space software from the network communication device, a UDP datagram indicating a completion status indicating that reception and storage of the n-tuple and private session key by the network communication device is complete;
wherein the communicating, from the user space software to the network communication device, the outbound session packets is responsive to the receiving from the network communication device the UDP datagram indicating the completion status indicating that reception and storage of the n-tuple and private session key by the network communication device is complete.

12. The system of claim 10, the executable operations further comprising:
receiving, by the user space software from the network communication device, via an application programming interface, a completion status indicating that reception and storage of the n-tuple and private session key by the network communication device is complete;
wherein the communicating, from the user space software to the network communication device, the outbound session packets is responsive to the receiving, by the user space software from the network communication device, via the application programming interface, the completion status indicating that reception and storage of the n-tuple and private session key by the network communication device is complete.

13. A computer program product, comprising:
one or more computer readable storage mediums having program code stored thereon, the program code stored on the one or more computer readable storage mediums collectively executable by a data processing system to initiate operations including:
establishing a secure communication tunnel between user space software and a client device;
accessing a private session key from a cryptographic service;
communicating, from the user space software to a network communication device, the private session key, wherein the private session key is not known to, nor discovered by, a hypervisor stack nor an operating system space of a data processing system hosting the user space software; and
communicating, from the user space software to the network communication device, outbound session packets;
wherein the network communication device is programmed to initiate executable operations comprising:
generating, by the network communication device, encrypted outbound session packets by encrypting the outbound session packets using the private session key;
communicating, by the network communication device to the client device via the secured communication tunnel, the encrypted outbound session packets;
receiving, by the network communication device from the client device, via the secured communication tunnel, inbound session packets;
generating, by the network communication device, decrypted inbound session packets by decrypting the inbound session packets using the private session key; and
communicating, from the network communication device to the user space software, the decrypted inbound session packets.

14. The computer program product of claim 13, wherein the program code is executable by the data processing system to initiate operations further comprising:
receiving from an operating system space a port identifier for a port provided by the operating system space to be used by the user space software for a communication session;
wherein the communicating, from the user space software to the network communication device, the private session key comprises communicating the private session key to the network communication device, via the port identified by the port identifier, in at least one User Datagram Protocol (UDP) datagram.

15. The computer program product of claim 13, wherein communicating, from the user space software to the network communication device, the private session key, comprises communicating the private session key from the user space software to the network communication device via an application programming interface.

16. The computer program product of claim 13, wherein the program code is executable by the data processing system to initiate operations further comprising:
communicating, from the user space software to the network communication device, a n-tuple, the n-tuple comprising data indicating a source IP address and a destination IP address, wherein the network communication device stores the n-tuple in association with the private session key to a software stack of the network communication device.

17. The computer program product of claim 16, wherein the program code is executable by the data processing system to initiate operations further comprising:
receiving, by the user space software from the network communication device, a UDP datagram indicating a completion status indicating that reception and storage of the n-tuple and private session key by the network communication device is complete;
wherein the communicating, from the user space software to the network communication device, the outbound session packets is responsive to the receiving from the network communication device the UDP datagram indicating the completion status indicating that reception and storage of the n-tuple and private session key by the network communication device is complete.

18. The computer program product of claim 16, wherein the program code is executable by the data processing system to initiate operations further comprising:
receiving, by the user space software from the network communication device, via an application programming interface, a completion status indicating that reception and storage of the n-tuple and private session key by the network communication device is complete;
wherein the communicating, from the user space software to the network communication device, the outbound session packets is responsive to the receiving, by the user space software from the network communication device, via the application programming interface, the completion status indicating that reception and storage of the n-tuple and private session key by the network communication device is complete.

* * * * *